(12) United States Patent
Coleman et al.

(10) Patent No.: US 12,656,997 B2
(45) Date of Patent: Jun. 16, 2026

(54) VIRTUAL SOUND ENGINEER SYSTEM AND METHOD

(71) Applicant: VIRTUAL SOUND ENGINEER, INC., Wilmington, DE (US)

(72) Inventors: Wallace Levi Coleman, Wilmington, DE (US); Charles Homer, Lawrenceville, GA (US)

(73) Assignee: VIRTUAL SOUND ENGINEER, INC., Wilmington, DE (US)

( * ) Notice: Subject to any disclaimer, the term of this patent is extended or adjusted under 35 U.S.C. 154(b) by 664 days.

(21) Appl. No.: 18/082,925

(22) Filed: Dec. 16, 2022

(65) Prior Publication Data

US 2023/0123726 A1 Apr. 20, 2023

Related U.S. Application Data

(63) Continuation-in-part of application No. 17/217,906, filed on Mar. 30, 2021, now Pat. No. 11,561,758.

(Continued)

(51) Int. Cl.
*G06F 3/16* (2006.01)
*G06F 3/04815* (2022.01)
(Continued)

(52) U.S. Cl.
CPC .......... *G06F 3/165* (2013.01); *G06F 3/04815* (2013.01); *G06F 3/04847* (2013.01); *G06T 15/10* (2013.01); *G06T 2200/24* (2013.01)

(58) Field of Classification Search
CPC ......... G06F 3/165; G06F 3/011; H04H 60/04; H04H 60/05
See application file for complete search history.

(56) References Cited

U.S. PATENT DOCUMENTS 6,061,458 A 5/2000 East et al.
6,653,545 B2 11/2003 Redmann
(Continued)

FOREIGN PATENT DOCUMENTS

WO 2022/207821 A1 10/2022

OTHER PUBLICATIONS

U.S. Appl. No. 17/217,906, filed Mar. 30, 2021.
(Continued)

*Primary Examiner* — Andrew L Tank
(74) *Attorney, Agent, or Firm* — Barnes & Thornburg LLP

(57) ABSTRACT

A virtual sound engineer system includes a mobile device having a processor connected to an interface, the processor being configured to initiate a first remote access digital mixing session to remotely access a first digital mixing console communicatively coupled to a first plurality of peripheral devices disposed at a first location, initiate a second remote access digital mixing session to remotely access a second digital mixing console communicatively coupled to a second plurality of peripheral devices disposed at a second location different from the first, such that remotely accessing the first console and the second console includes adjusting sound output by at least one of the peripheral devices of the first console and at least one of the peripheral devices of the second console and at least a portion of the first mixing session and at least a portion of the second mixing session occur concurrently.

20 Claims, 6 Drawing Sheets

Related U.S. Application Data

(60) Provisional application No. 63/064,095, filed on Aug. 11, 2020.

(51) Int. Cl.
G06F 3/04847 (2022.01)
G06T 15/10 (2011.01)

(56) References Cited

U.S. PATENT DOCUMENTS

| | | | |
|---|---|---|---|
| 6,898,637 B2 | 5/2005 | Curtin | |
| 7,245,727 B2 | 7/2007 | Cresci et al. | |
| 7,742,609 B2 | 6/2010 | Yeakel et al. | |
| 8,028,323 B2 | 9/2011 | Weel | |
| 8,491,386 B2 | 7/2013 | Reiss et al. | |
| 9,078,091 B2 | 7/2015 | Lehtiniemi | |
| 9,686,030 B2 | 6/2017 | Holtman et al. | |
| 9,933,991 B2 | 4/2018 | Olesh et al. | |
| 10,263,656 B2 | 4/2019 | Fathollahi et al. | |
| 10,469,965 B2 | 11/2019 | Heineman | |
| 10,514,885 B2 | 12/2019 | Leppänen et al. | |
| 11,079,918 B2 | 8/2021 | Rotta | |
| 11,432,097 B2 * | 8/2022 | Munoz | G06F 3/167 |
| 11,528,307 B2 * | 12/2022 | Winsor | H04L 65/61 |
| 2002/0026256 A1 | 2/2002 | Hilton | |
| 2003/0229900 A1 * | 12/2003 | Reisman | H04N 21/422 |
| | | | 348/E7.071 |
| 2010/0303261 A1 | 12/2010 | Stieler von Heydekampf | |
| 2012/0195445 A1 | 8/2012 | Inlow | |
| 2013/0262687 A1 | 10/2013 | Avery et al. | |
| 2014/0006483 A1 | 1/2014 | Garmark | |
| 2014/0064519 A1 * | 3/2014 | Silfvast | G10H 1/18 |
| | | | 381/119 |
| 2014/0328485 A1 | 11/2014 | Saulters | |
| 2015/0234530 A1 | 8/2015 | Lengling | |
| 2015/0293649 A1 | 10/2015 | Sukumar | |
| 2016/0266867 A1 * | 9/2016 | Olesh | G10H 1/46 |
| 2017/0364321 A1 | 12/2017 | Chavez et al. | |
| 2018/0054487 A1 | 2/2018 | Hebsur | |
| 2018/0190250 A1 | 7/2018 | Hiskey et al. | |
| 2018/0226084 A1 | 8/2018 | Lin | |
| 2018/0308518 A1 | 10/2018 | Leonard | |
| 2018/0349088 A1 * | 12/2018 | Leppänen | G06F 3/011 |
| 2019/0215540 A1 | 7/2019 | Nicol | |
| 2020/0042284 A1 * | 2/2020 | Milne | G06F 3/04883 |
| 2022/0050659 A1 | 2/2022 | Coleman et al. | |

OTHER PUBLICATIONS

Korff, "Tablet-controlled Mixers," accessed on-line at: https://www.soundonsound.com/reviews/tablet-controlled-mixers, (Jun. 11, 2020).

Mixoline, "iOS Applications for Console Control," accessed on-line at: https://www.mixonline.com/technology/ios-applications-console-control-423069 (Nov. 24, 2014).

Sounddevices, "Requirements for Remote Control of 6-Series," accessed on-line at: https://www.sounddevices.com/6-series-remote-ctrl-requirements/ (Sep. 13, 2019).

International Search & Written Opinion dated Mar. 13, 2024—PCT Application No. PCT/US/2023/81568.

* cited by examiner

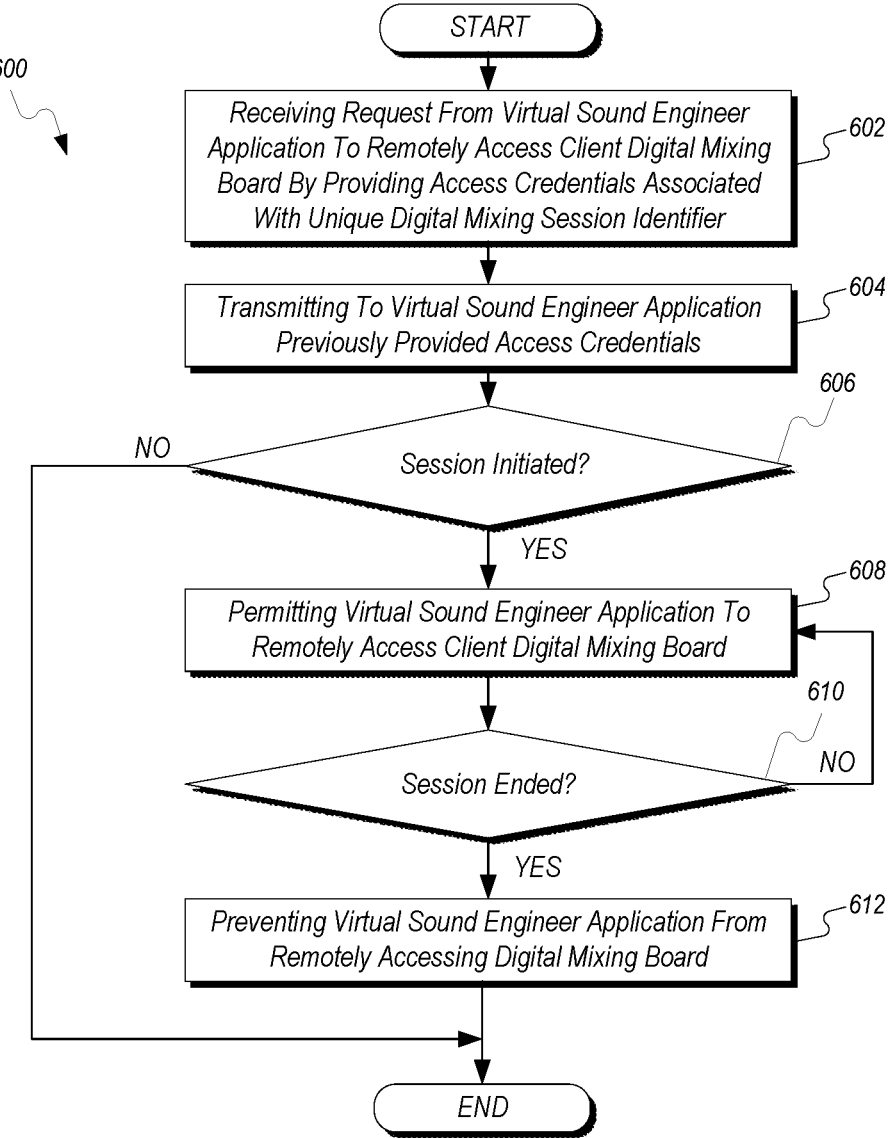

600

START

*Receiving Request From Virtual Sound Engineer Application To Remotely Access Client Digital Mixing Board By Providing Access Credentials Associated With Unique Digital Mixing Session Identifier* — 602

*Transmitting To Virtual Sound Engineer Application Previously Provided Access Credentials* — 604

606

NO

Session Initiated?

YES

*Permitting Virtual Sound Engineer Application To Remotely Access Client Digital Mixing Board* — 608

610

NO

Session Ended?

YES

*Preventing Virtual Sound Engineer Application From Remotely Accessing Digital Mixing Board* — 612

END

FIG. 6

VIRTUAL SOUND ENGINEER SYSTEM AND METHOD

CROSS-REFERENCE TO RELATED APPLICATIONS

This application is a continuation-in-part of U.S. application Ser. No. 17/217,906, entitled "VIRTUAL SOUND ENGINEER SYSTEM AND METHOD," which was filed on Mar. 30, 2021, and which claimed priority to Provisional Patent Application having Ser. No. 63/064,095, filed Aug. 11, 2020, the disclosure of each of which is hereby incorporated by reference in its entirety.

TECHNICAL FIELD

The present disclosure generally relates to remote sound engineering management. In particular, the present disclosure relates to remotely controlling multiple digital mixing consoles.

BACKGROUND

A digital sound mixer may be configured to convert received analog audio signals to a digital form prior to processing the audio signal. Example digital sound mixer may include one or more peripheral equipment input terminals and may be configured to perform microphone signal preamplification, channel equalization, and dynamic range compression.

SUMMARY

A virtual sound engineer system includes a mobile device including a processor connected to an interface, the processor being configured to: in response to receiving a first access code, initiate a first remote access digital mixing session to remotely access a first digital mixing console, wherein the first digital mixing console is communicatively coupled to a first plurality of peripheral devices disposed at a first location, in response to receiving a second access code, initiate a second remote access digital mixing session to remotely access a second digital mixing console, wherein the second digital mixing console is communicatively coupled to a second plurality of peripheral devices disposed at a second location different from the first, wherein remotely accessing the first digital mixing console and the second digital mixing console includes adjusting sound output by at least one of the peripheral devices of the first digital mixing console and at least one of the peripheral devices of the second digital mixing console, and wherein at least a portion of the first remote access digital mixing session and at least a portion of the second remote access digital mixing session occur concurrently.

A method includes, in response to receiving a first access code, by a processor, initiating a first remote access digital mixing session to remotely access a first digital mixing console, wherein the first digital mixing console is communicatively coupled to a first plurality of peripheral devices disposed at a first location, in response to receiving a second access code, initiating a second remote access digital mixing session to remotely access a second digital mixing console, wherein the second digital mixing console is communicatively coupled to a second plurality of peripheral devices disposed at a second location different from the first, wherein remotely accessing the first digital mixing console and the second digital mixing console includes adjusting sound output by at least one of the peripheral devices of the first digital mixing console and at least one of the peripheral devices of the second digital mixing console, and wherein at least a portion of the first remote access digital mixing session and at least a portion of the second remote access digital mixing session occur concurrently.

A virtual sound engineer system includes a mobile device including a processor and an interface connected to the processor. The processor is configured to generate a first unique identifier for a first remote access digital mixing session and generating first access credentials associated with the first unique identifier, generate a second unique identifier for a second remote access digital mixing session and generate second access credentials associated with the second unique identifier, transmit the first access credentials to a first user device disposed at a first location and transmit the second access credentials to a second user device disposed at a second location different from the first, initiate the first remote access digital mixing session to remotely access a first digital mixing console stored on the first user device, wherein the first digital mixing console is communicatively coupled to a first plurality of peripheral devices disposed at the first location, initiate the second remote access digital mixing session to remotely access a second digital mixing console stored on the second user device, wherein the second digital mixing console is communicatively coupled to a second plurality of peripheral devices disposed at the second location, wherein remotely accessing the first digital mixing console and the second digital mixing console includes adjusting sound output by at least one of the peripheral devices of the first digital mixing console and at least one of the peripheral devices of the second digital mixing console, and wherein at least a portion of the first remote access digital mixing session and at least a portion of the second remote access digital mixing session occur concurrently.

A virtual sound engineer system includes a mobile device coupled to a head-mounted display. The mobile device is configured to: in response to receipt of a first access code including authorization information, initiate a first remote access digital mixing session by generating a virtual sound engineering dashboard to remotely access a first digital mixing console disposed at a first location, and wherein the first digital mixing console is communicatively coupled to a first plurality of peripheral devices disposed at the first location; receive real-time audio and video data captured by at least one of the peripheral devices of the first digital mixing console at the first location in response to initiating the first remote access digital mixing session; display, with the head-mounted display at a second location different from the first location, the virtual sound engineering dashboard in a virtual reality interface based on the real-time audio and video data; and control the first digital mixing console with the virtual sound engineering dashboard in the virtual reality interface.

A method for a virtual sound engineer system includes, in response to receiving a first access code including authorization information, by a mobile device, initiating a first remote access digital mixing session by generating a virtual sound engineering dashboard to remotely access a first digital mixing console disposed at a first location, and wherein the first digital mixing console is communicatively coupled to a first plurality of peripheral devices disposed at the first location; receiving, by the mobile device, real-time audio and video data captured by at least one of the peripheral devices of the first digital mixing console at the first location in response to initiating the first remote access digital mixing session; displaying, by the mobile device, with a head-mounted display at a second location different from the first location, the virtual sound engineering dashboard in a virtual reality interface based on the real-time audio and video data; and controlling, by the mobile device, the first digital mixing console with the virtual sound engineering dashboard in the virtual reality interface.

BRIEF DESCRIPTION OF THE DRAWINGS

The detailed description particularly refers to the following figures, in which:

FIG. 6 is a block diagram illustrating an exemplary process flow for permitting remote access and control of a digital mixing console;

DETAILED DESCRIPTION

Figure 1:
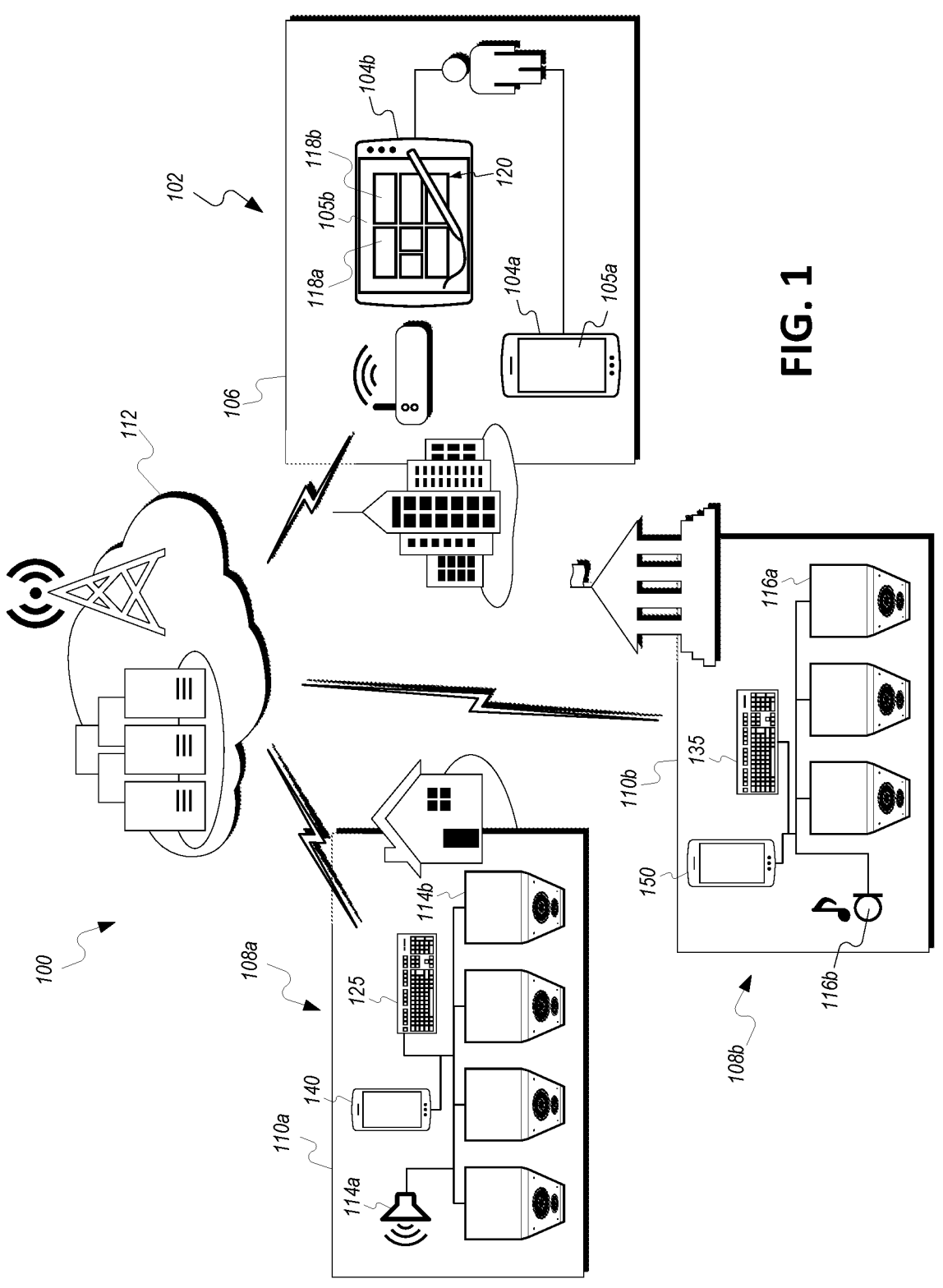
FIG. 1 is a block diagram illustrating an example sound engineering system.

While the concepts of the present disclosure are susceptible to various modifications and alternative forms, specific exemplary embodiments are been shown by way of example in the drawings and will be described. It should be understood, however, that there is no intent to limit the concepts of the present disclosure to the particular forms disclosed; on the contrary, the intention is to cover all modifications, equivalents, and alternatives falling within the spirit and scope of the invention as defined by the appended claims.

References in the specification to "one embodiment," "an embodiment," "an illustrative embodiment," etc., indicate that the described embodiment may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

An example virtual sound engineering system of the present disclosure is configured to manage, concurrently, sound output by each of a plurality of digital mixing consoles located at different geographic locations. A virtual sound engineering application includes a dashboard interface configured to receive user (e.g., sound engineer) input to control one or more devices connected to a digital mixing console that is located at a remote site. A virtual sound engineering application is configured to receive, from a mobile device at the remote site, an access code (e.g., an access identifier) that authorizes the virtual sound engineering application to generate a virtual sound engineering dashboard including one or more controls for peripheral devices connected to the digital mixing console at the remote site. The mobile device at the remote site may be configured to, in response to a corresponding request, issue, to the virtual sound engineering application, the access code for controlling one or more peripheral devices connected. In some instances, the mobile device may issue the access code, to the virtual sound engineering application, for controlling fewer than all peripheral devices connected thereto.

The virtual sound engineering application may be configured to receive a video feed from the mobile device located at the remote site, where the video feed includes video data captured in real time at the remote site. In one example, a camera of the mobile device at the remote site may be oriented toward event guests, performers, or the audience, such that the video feed window of the virtual sound engineering application is indicative of a reaction or behavior of the guests or the audience to changes in sound balance at the remote site, where the changes in sound balance are effectuated using the virtual sound engineering application.

FIG. 1 illustrates an example system 100 for monitoring and controlling, from a remote location, sound input and output by peripheral devices located at different geographic locations from one another and from the remote location. The system 100 includes a virtual sound engineer system 102 accessible using one or more virtual sound engineer user devices 104 (e.g., virtual sound engineer devices 104a, 104b). As described in reference to at least FIGS. 2A-2B, the virtual sound engineer device 104 includes a virtual sound engineer access application 120 downloadable from a digital marketplace (e.g., an app store) of the virtual sound engineer devices 104.

Interface of the virtual sound engineer access application 120 is accessible via one or more mobile or stationary virtual sound engineer devices 104 (e.g., virtual sound engineer devices 104a, 104b), such as, but not limited to, a computer, a smart phone, a tablet computer, a laptop computer, a notebook computer, a mobile computing device, a desktop computer, a work station, a cellular telephone, a handset, a messaging device, a vehicle telematics device, a network appliance, a web appliance, a distributed computing system, a multiprocessor system, a consumer electronic device, a digital television device, and/or any other computing device.

Example virtual sound engineer device 104 includes one or more audio and visual output devices, such as, but not limited to, speakers and displays, and one or more audio and visual input devices, such as, but not limited to, microphones and cameras. Example virtual sound engineer device 104 may receive user input using one or more user input interfaces 105, such as, but not limited to, touch screens, touch pads, digital and/or physical buttons, keys, and keyboards. Additionally or alternatively, the virtual sound engineer device 104 may be configured to perform speech, face, and hand gesture recognition and/or receive user input by way of voice commands, stylus inputs, single- or multi-touch gestures, and touchless hand gestures.

The virtual sound engineer system 102 is disposed at a remote location 106. A first digital mixing site 108a is located at a first location 110a and a second digital mixing site 108b is located at a second location 110b, where each of the first location 110a and the second location 110b are different from one another and from the remote location 106. Each of the first digital mixing site 108a and the second digital mixing site 108b include corresponding user devices 140, 150. The user device 140 of the first digital mixing site 108a is communicatively coupled to a first digital mixing console 125 of the mixing site 108a, wherein the first digital mixing console 125 is communicatively coupled to at least one peripheral device 114. The user device 150 of the second digital mixing site 108b is communicatively connected to a second digital mixing console 135 of the mixing site 108b, wherein the second digital mixing console 135 is communicatively coupled to one or more peripheral devices 116 of the mixing site 108b.

In one example, different locations 106, 110a, and 110b may include one or more of different municipalities, townships, counties, cities, countries, and continents. In another example, the locations 106, 110a, and 110b include one or more different rooms or floors within a single building, adjacent buildings, buildings or locations disposed within a line of sight from one another, and buildings or locations within a predefined distance of one another (e.g., within a radius of 0.5 miles, 5 miles, or one hundred miles). In still another example, one or more of the locations 106, 110a, and 110b may be a location partially or entirely outside an enclosure or structure, such as an enclosed or open-air stage or dance floor in a multi-stage or a multi-dance floor event, such as, but not limited to, a concert, a fair, a festival, or another celebration or a religious or secular commemoration.

Moreover, while the locations 110a and 110b are separated from one another by a predefined distance, digital mixing sessions taking place at each of the different locations 110a and 110b may overlap in time, either in whole or in part. Put another way, at least a portion of the digital mixing sessions at each of the locations 110a and 110b may occur at a same time, concurrently, contemporaneously, or simultaneously. Further, duration of the overlap the digital mixing session at the locations 110a and 110b may, but need not, be several seconds, minutes, hours, days, or any other amount of time.

The virtual sound engineer system 102 is communicatively coupled, via a network 112, to each of the first digital mixing site 108a and the second digital mixing site 108b. The network 112 may be embodied as any type of network capable of communicatively connecting the virtual sound engineer system 102 to each of the first digital mixing site 108a and the second digital mixing site 108b, such as a cloud network, an Ethernet-based network, etc. Accordingly, the network 112 may be established through a series of links/interconnects, switches, routers, and other network devices which are capable of connecting the virtual sound engineer system 102 to each of the first digital mixing site 108a and the second digital mixing site 108b of the network 112. As will be described in further detail below (see, e.g., FIGS. 2A-2B), the virtual sound engineer system 102 and each of the first digital mixing site 108a and the second digital mixing site 108b form a comprehensive data processing, analysis, and exchange system.

The virtual sound engineer system 102 is configured to monitor and control sound output by one or more peripheral input and output devices 114, 116 communicatively coupled to the first digital mixing console 125 of the first digital mixing site 108a and the second digital mixing console 135 of the second digital mixing site 108b, respectively. In an example, the virtual sound engineering system 102 is configured to generate, e.g., during a first digital mixing session, a first digital mixing console 118a including one or more controls for controlling input and output of the peripheral devices 114 of the first digital mixing site 108a. In another example, the virtual sound engineering system 102 is configured to generate, e.g., during a second digital mixing session, a second digital mixing console 118b including one or more controls for controlling input and output of the peripheral devices 116 of the second digital mixing site 108b.

Each of the first digital mixing console 118a and the second digital mixing console 118b may comprise digital renderings, reproductions, or representations, whether exact or approximate, of the first digital mixing console 125 and the second digital mixing console 135, respectively. Additionally or alternatively, one or both of the first digital mixing console 118a and the second digital mixing console 118b may comprise digital representations indicative of remote access (by the virtual engineer device 104) of the user device 140 connected to the first digital mixing console 125 and the user device 150 connected to the second digital mixing console 135, respectively. In some instances, the first digital mixing console 118a, as rendered on the interface 105, may include either same or different number (whether more or fewer) of controls as the first digital mixing console 125 and the second digital mixing console 118b, as rendered on the interface 105, may include either same or different number (whether more or fewer) of controls as the second digital mixing console 135. As just one example, one or more controls of the first digital mixing console 118a, as rendered on the interface 105, may be arranged differently from corresponding controls of the first digital mixing console 125 and/or controls of the second digital mixing console 118b, as rendered on the interface 105, may be arranged differently from corresponding controls of the second digital mixing console 135.

The virtual sound engineer system 102 is configured to receive, via the first digital mixing console 118a, user input indicating a request to balance the sound input and output by microphones, speakers, and instruments connected to the first digital mixing console 125 of the first digital mixing site 108a. The virtual sound engineer system 102 is configured to receive, via the second digital mixing console 118b, user input indicating a request to balance the sound input and output by microphones, speakers, and instruments connected to the second digital mixing console 135 of the second digital mixing site 108b.

Figure 2B:
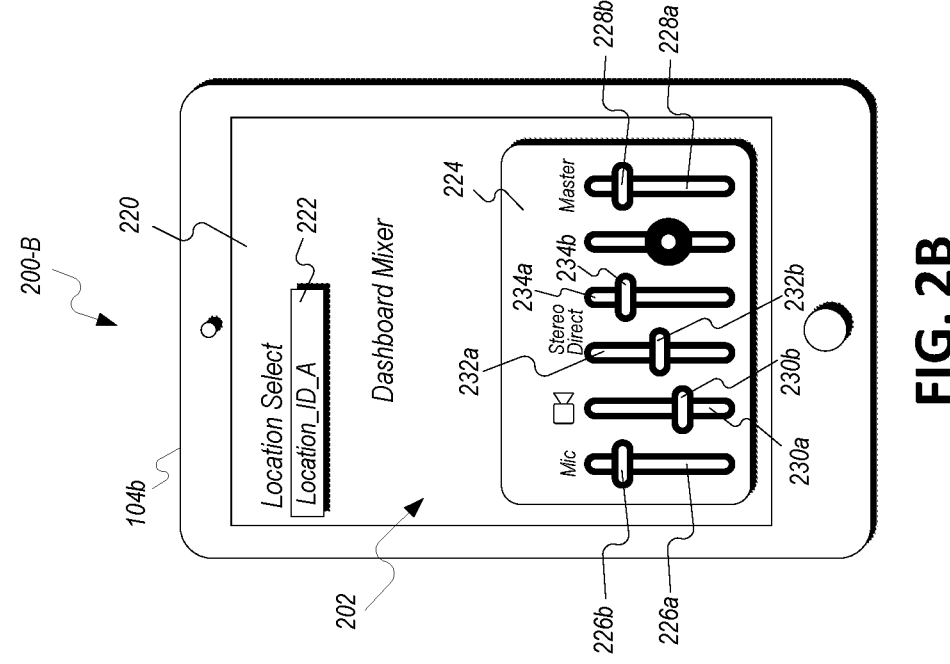
FIGS. 2A-2B are block diagrams illustrating example interface layouts of the sound engineering system of FIG. 1.
Figure 2A:
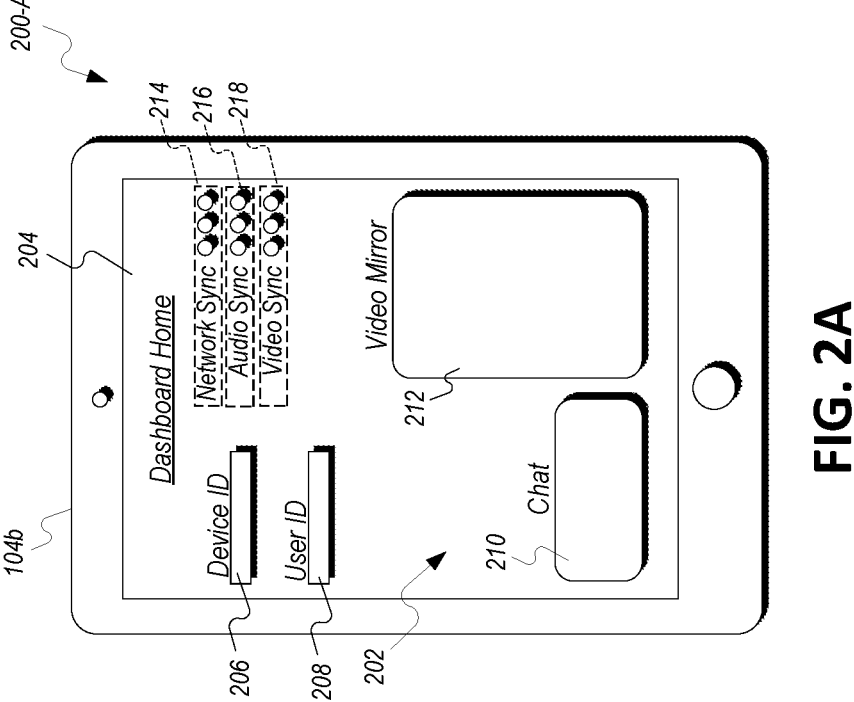

FIG. 2A illustrates an example layout 200-A of a first digital interface 204 of the virtual sound engineer access application 202 accessible from the virtual sound engineer device 104 (e.g., the virtual sound engineer device 104b). The first digital interface 204 may be used to initiate a connection (e.g., via the network 112) with each of the digital mixing consoles 125, 135 of the first digital mixing site 108a and the second digital mixing site 108b to enable monitoring and controlling operation of the peripheral devices 114, 116 connected thereto.

One or more operations may precede or follow the establishing of the connection between the virtual sound engineer device 104 and one of the digital mixing consoles 125, 135. In an example, prior to initiating a connection, the virtual sound engineer access application 202 may be configured to request user input indicative of a user profile setup, such as, but not limited to, name or stage name of the sound engineer, music genre in which the sound engineer specializes, sound engineer experience level, and professional accomplishments. Additionally or alternatively, the virtual sound engineer access application 202 may be configured to generate a user profile using personal details associated with an existing identity profile of a social media or another platform, e.g., via a user-authorized single sign-on operation.

The first digital interface 204 includes a device identifier input field 206 and a user identifier input field 208. The virtual sound engineer access application 202 may request user input for one or both of the device identifier input field 206 and the user identifier input field 208 prior to proceeding with initiating the connection between the virtual sound engineer device 104 and one of the digital mixing consoles 125, 135. In one example, a user identifier of the virtual sound engineer using the virtual sound engineer access application 202 is a string of numeric, alpha-numeric, or alphabetical characters selected by the user or randomly assigned by the application 202 during a user profile setup.

The first digital interface 204 of the virtual sound engineer access application 202 includes a chat application window 210. In some instances, the first digital interface 204 includes a video feed window 212. The video feed window 212 may be configured to generate a digital video indicative of a video data captured at one of the first digital mixing site 108a and the second digital mixing site 108b. For example, the first digital mixing console 125 of the first digital mixing site 108a may be equipped with an integrated digital video camera and may be configured to transmit video data captured by the video camera to the virtual sound engineer device 104 to be reproduced within the video feed window 212.

The first digital interface 204 of the virtual sound engineer access application 202 includes a network connection status indicator 214, an audio connection status indicator 216, and a video connection status indicator 218.

FIG. 2B illustrates an example layout 200-B of a second digital interface 220 of the virtual sound engineer access application 202 accessible from the virtual sound engineer device 104. The virtual sound engineer access application 202 may generate the second digital interface 220 in response to the connection being established between the virtual sound engineer device 104 and one of the digital mixing consoles 125, 135 (e.g., according to one or more operations described in reference to at least FIG. 2A). The second digital interface 220 includes a location identifier input field 222. Example location identifier may correspond to, or be associated with, one of the first digital mixing site 108a and the second digital mixing site 108b.

The second digital interface 220 of the virtual sound engineer access application 202 includes a virtual digital mixing console 224. In an example, the virtual digital mixing console 224 may be the first digital mixing console 118a for controlling input and output of the peripheral devices 114 of the first digital mixing site 108a. In another example, the virtual digital mixing console 224 may be the second digital mixing console 118b for controlling input and output of the peripheral devices 116 of the second digital mixing site 108b. To that end, the virtual digital mixing console 224 includes a plurality of controls for controlling input and output of the peripheral devices at one of the first and second digital mixing sites 108a, 108b.

The virtual digital mixing console 224 includes a microphone control 226a, a master volume control 228a, a camera output control 230a, and a pair of stereo controls 232a, 234a. In one example, each of the controls 226a, 228a, 230a, 232a, and 234a includes a corresponding adjustment slider 226b, 228b, 230b, 232b, and 234b. While slider-type adjustments are illustrated, the virtual digital mixing console 224 of the present disclosure is not limited thereto. Example virtual digital mixing console 224 may include more or fewer controls that are same or different control types having same or different adjustment means (e.g., knobs, dials, buttons, and so on).

In one example, the virtual digital mixing console 224 of the virtual sound engineer access application 202 may be configured to receive user (e.g., virtual sound engineer) input indicative of a request to change a position of one or more corresponding adjustment sliders 226b, 228b, 230b, 232b, and 234b of one or more controls 226a, 228a, 230a, 232a, and 234a to balance the sound output by, for example, the peripheral devices 114 of the first digital mixing site 108a. Accordingly, using the second digital mixing interface 220 of the virtual sound engineer application 202, the sound engineer balances the sounds output by microphones, speakers and instruments.

Figures 3, 4, 7:
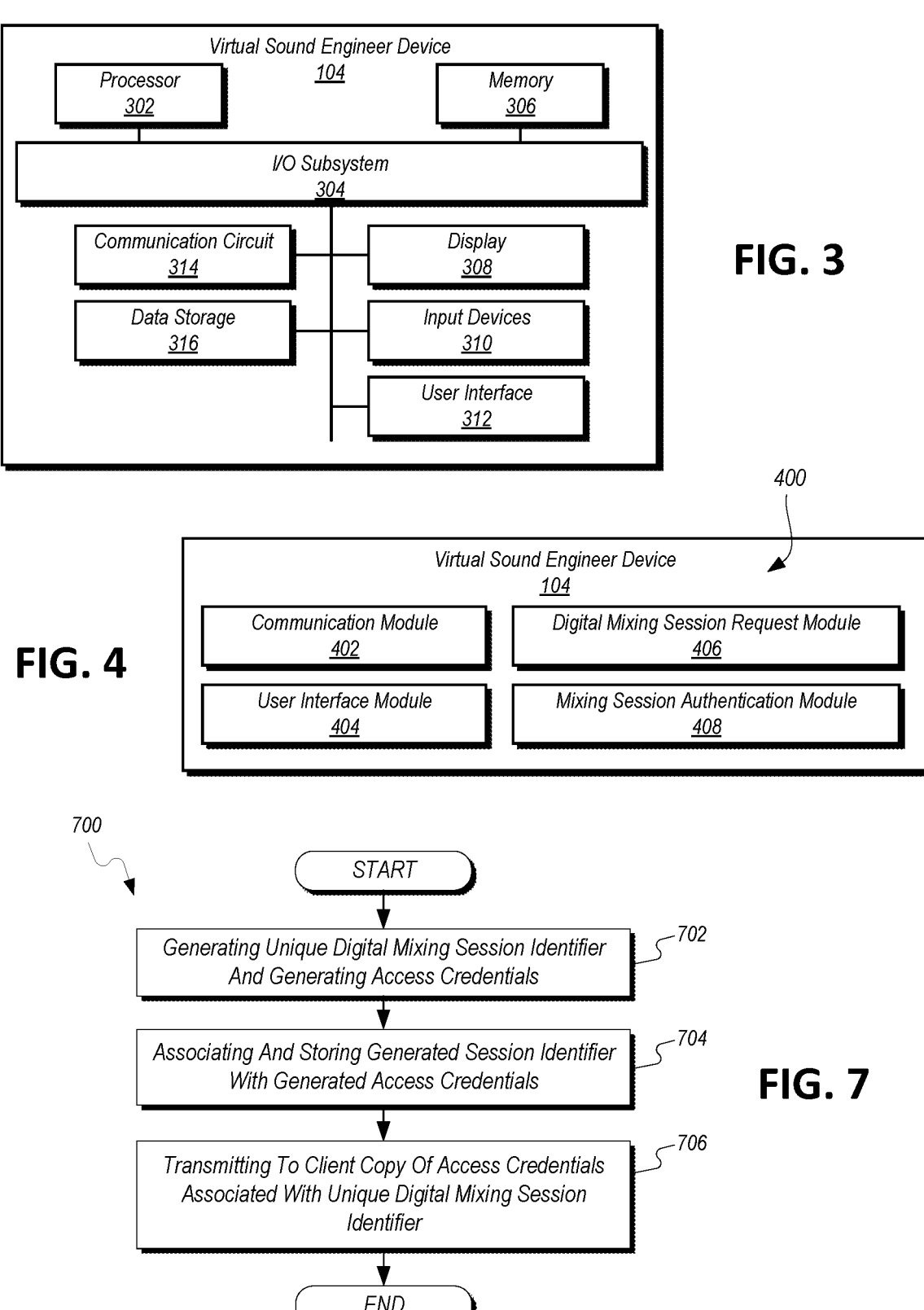
FIG. 3 is a block diagram illustrating an example virtual sound engineer device.
FIG. 4 is a block diagram illustrating an example environment generated by virtual sound engineer device of FIG. 3.
FIG. 7 is a block diagram illustrating an exemplary process flow for generating access credentials for remotely accessing multiple digital mixing consoles.

Referring now to FIG. 3, an example virtual sound engineer device 104 is shown and it includes a processor 302, an I/O subsystem 304, a memory 306, a display 308, input device(s) 310, a user interface 312, a communication circuit 314, and a data storage 316. As one example, one or more of the display 308, the input device(s) 310, the user interface 312 may comprise the interface 105 describe in reference to at least FIG. 1. Moreover, while FIG. 3 is directed to the virtual sound engineer device 104, one or more of the user device 140 and the user device 150 may include similar components configured to perform operations as described herein. Of course, in other embodiments, the virtual sound engineer device 104, the user device 140, and the user device 150 may include alternative or additional components, such as those commonly found in a server, router, switch, or other network device. Additionally, in some embodiments, one or more of the illustrative components may be incorporated in, or otherwise form a portion of, another component. For example, the memory 306, or portions thereof, may be incorporated in one or more processors 302.

The processor 302 may be embodied as any type of processor capable of performing the described functions. The processor 302 may be embodied as a single or multi-core processor(s), digital signal processor, microcontroller, or other processor or processing/controlling circuit. The memory 306 may be embodied as any type of volatile or non-volatile memory or data storage capable of performing the functions described herein. In operation, the memory 306 may store various data and software used during operation of the virtual sound engineer device 104, such as operating systems, applications, programs, libraries, and drivers. The memory 306 is communicatively coupled to the processor 302 via the I/O subsystem 304, which may be embodied as circuitry and/or components to facilitate input/output operations with the processor 302, the memory 306, and other components of the virtual sound engineer device 104. For example, the I/O subsystem 304 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 304 may form a portion of a system-on-a-chip (SoC) and be incorporated, along with the processors 302, the memory 306, and other components of the virtual sound engineer device 104, on a single integrated circuit chip.

The display 308 may be embodied as any type of display capable of displaying digital information to a user such as a liquid crystal display (LCD), a light emitting diode (LED), a plasma display, a cathode ray tube (CRT), or other type of display device. As described below, the display 308 may be used to display a graphical user interface or other information to the user of the virtual sound engineer device 104. Additionally, in some embodiments, the virtual sound engineer device 104 may include a touch screen coupled to or incorporated in the display 308. The touch screen may be used to receive user tactile input.

The communication circuit 314 may be embodied as any communication circuit, device, or collection thereof, capable of enabling communications between the virtual sound engineer device 104 and the user devices 140, 150 and/or the digital mixing consoles 125, 135 via the network 112. To do so, the communication circuit 314 may be configured to use any one or more communication technology and associated protocols (e.g., Ethernet, Bluetooth®, Wi-Fi®, WiMAX, etc.) to effect such communication.

The data storage 316 may be embodied as any type of device or devices configured for short-term or long-term storage of data such as, for example, memory devices and circuits, memory cards, hard disk drives, solid-state drives, or other data storage devices. The data storage 316 and/or the memory 306 may store various other data useful during the operation of the virtual sound engineer device 104. As one example, the data storage 316 may store one or more unique digital mixing session identifiers corresponding to one or more remote access digital mixing sessions. As another example, the data storage 316 may store one or more access credentials, such as, passwords, access codes, key phrases, and other authentication parameters in association with each of the one or more mixing session identifiers.

Referring now to FIG. 4, in use, the virtual sound engineer device 104 establishes an environment 400. The illustrative environment 400 includes a communication module 402, a user interface module 404, a digital mixing session module 406, and a mixing session authentication module 408. Each of the modules and other components of the environment 400 may be embodied as firmware, software, hardware, or a combination thereof. For example the various modules, logic, and other components of the environment 400 may form a portion of, or otherwise be established by, the processor 302, the I/O subsystem 304, an SoC, or other hardware components of the virtual sound engineer device

104. As such, in some embodiments, any one or more of the modules of the environment 400 may be embodied as a circuit or collection of electrical devices (e.g., a communication circuit, a user interface circuit, an alert receipt circuit, a user feedback detection circuit, etc.).

The communication module 402 is configured to facilitate communications between the virtual sound engineer device 104 and other devices of the system 100. For example, the communication module 402 may establish communication links, via the communication circuit 314, with one or more of the user device 140, the user device 150, the digital mixing console 125, the digital mixing console 135 to change sound output by one or more peripheral devices connected (either directly or indirectly) thereto.

The user interface module 404 is configured to provide an interface to a user for interaction with the virtual sound engineer device 104. For example, the user interface module 404 may receive user input from the user interface 312 and/or the touchscreen of the display 308. Additionally the user interface module 404 is configured to control or manage the input devices 310. For example, the user interface module 404 may receive or detect a command via the input devices 310 to change sound output by one or more peripheral devices during the first and/or second digital mixing sessions as discussed in more detail below.

The digital mixing session request module 406 is configured to receive, via the communication module 402, data indicating a request for a digital mixing session. The digital mixing session request module 406 is communicatively coupled to the user interface module 404. Upon receiving request for a digital mixing session from one or both of the user devices 140, 150, the digital mixing session request module 406 causes the user interface module 404 to update information rendered on the display 308 as discussed in more detail below.

The mixing session authentication module 408 is configured to generate a unique digital mixing session identifier corresponding to a remote access digital mixing session and generate access credentials, such as, password, access code, key phrase, or another authentication parameter. The mixing session authentication module 408 is configured to associate and store the generated unique digital mixing session identifier with the generated access credentials. The mixing session authentication module 408 is configured to transmit (e.g., via the communication module 402) a copy of the stored access credentials to the client device prior to requesting initiation of a remote access digital mixing session.

The mixing session authentication module 408 is configured to detect whether or not verification credentials provided by the user device (e.g., one of the user devices 140, 150) requesting the digital mixing session match the stored digital session credentials. For example, in response to a request (as indicated, for example, by one or more corresponding signals from the digital mixing session request module 406) to initiate a remote access digital mixing session, the mixing session authentication module 408 is configured to request, from the user device, access credentials associated with the remote access digital mixing session. The mixing session authentication module 408 determines whether access credentials received from the client device (e.g., user device 140 or user device 150) match stored credential associated with the remote access digital mixing session. If the received access credentials do not match the stored credentials, the mixing session authentication module 408 transmits a notification to the client device that the provided credentials were invalid and that the session connection was denied. In response to detecting that the received access credentials match the stored credentials, the mixing session authentication module 408 transmits via the communication module 402 data indicating that the connection has been established and/or the digital mixing session initiated to the user device (e.g., the client device) that requested the digital mixing session.

Figure 5:
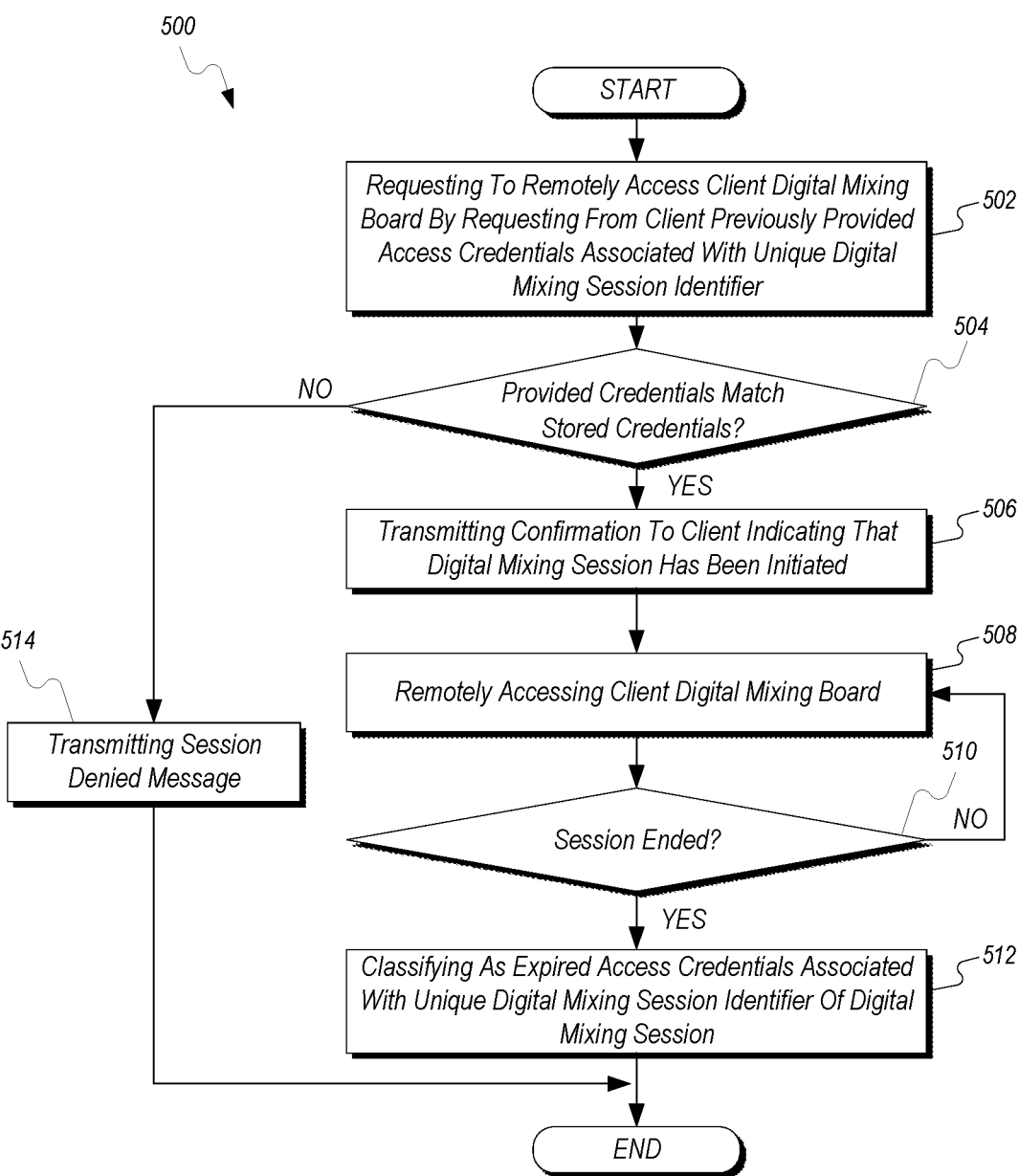
FIG. 5 is a block diagram illustrating an exemplary process flow for remotely accessing and controlling multiple digital mixing consoles.

FIG. 5 illustrates an example process 500 for remotely accessing and controlling multiple digital mixing consoles. The process 500 may be executed by one or more components of the remote access digital mixing console application described in reference to at least FIGS. 1, 2A-2B, and 3-4. In one example, the process 500 may be executed by processor 302 of the virtual sound engineer device 104 described in reference to at least FIG. 3. The process 500 begins at block 502 where the processor 302 prepares to initiate a remote access digital mixing session by requesting, from the client device, access credentials associated with the remote access digital mixing session. At block 504, the processor 302 (and/or the mixing session authentication module 408) determines whether access credentials received from the client device (e.g., user device 140 or user device 150) match stored credential associated with the remote access digital mixing session. If the received access credentials do not match the stored credentials, the processor 302, at block 514, transmits a notification to the client device that the provided credentials were invalid and that the session connection was denied. The processor 302 may then exit the process 500.

In response to determining that the received credentials match the stored credentials associated with the remote access digital mixing session, the processor 302, at block 506, transmits a notification to the client device indicating that authentication has been successfully completed and the remote access digital mixing session has been initiated.

At block 508, the processor 302 initiates remotely accessing client digital mixing board, e.g., using remote access environment within the virtual sound engineering application, to monitor operation and control sound balance as output by the sound input and output by peripheral devices connected to the client digital mixing board. In some instances, the processor 302 may be configured to determine, at block 510, whether the remote access digital mixing session has been ended by either the virtual sound engineering application, on one end, or the client device, on the other end. Additionally or alternatively, the processor 302 may be configured to determine whether the remote access digital mixing session has been interrupted due to loss or degradation of network connectivity between the client device and the virtual sound engineer device 104. In response to determining that the session has not been ended, the processor 302 returns to block 508 where the processor 302 continues to remotely accessing client digital mixing board (e.g., digital mixing boards 125, 135) to monitor operation and control sound balance as output by the sound input and output by peripheral devices connected to the client digital mixing board.

In response to determining at block 510 that the session has been ended, the processor 302, at block 512, classifies as expired the stored access credentials associated with the unique digital mixing session identifier of the remote access digital mixing session. In one example, to classify the stored access credentials, the processor 302 may change status identifier corresponding to the stored access credentials from an active status to an expired status. The process 500 may then end. In some instances, the process 500 may be repeated in response to transmitting a request to remotely access the client digital mixing board or in response to a different request.

FIG. 6 illustrates an example process 600 for permitting remote access and control of a digital mixing console. The process 600 may be executed by one or more components of the client device and/or a client side of the remote access digital mixing console application described in reference to at least FIGS. 1 and 2A-2B. The process 600 begins at block 602 where the processor 302 receives a request, from the virtual sound engineer application, to initiate a remote access digital mixing session by providing, by the client device, access credentials associated with the remote access digital mixing session.

At block 604, the processor 302 transmits to the virtual sound engineer application previously provided access credentials corresponding to the unique digital mixing session identifier of the remote access digital mixing session. In one example, the processor 302 may be configured to receive the access credentials from the virtual sound engineer application and/or the virtual sound engineer device 104 prior to receiving the request to initiate a remote access digital mixing session. As described in reference to at least FIGS. 4 and 7, the virtual sound engineer device 104 may be configured to generate and store the access credentials corresponding to the unique digital mixing session identifier of the remote access digital mixing session. The virtual sound engineer device 104 may transmit a copy of the stored access credentials to the client device prior to requesting to initiate a remote access digital mixing session. (See, e.g., FIG. 7.)

At block 606, the processor 302 determines whether the authentication of the credentials has been completed and the remote access digital mixing session has been initiated. If the remote access digital mixing session has not been initiated, e.g., upon a corresponding notification from the virtual sound engineer application that session initiation has been denied, the processor 302 may exit the process 600.

In response to determining that the remote access digital mixing session has been successfully initiated, the processor 302, at block 608, initiates permitting remote accessing of the client digital mixing board, e.g., using remote access environment within the virtual sound engineering application, to monitor operation and control sound balance as output by the sound input and output by peripheral devices connected to the client digital mixing board. In some instances, the processor 302 may be configured to determine, at block 610, whether the remote access digital mixing session has been ended by either the virtual sound engineering application, on one end, or the client device, on the other end. Additionally or alternatively, the processor 302 may be configured to determine whether the remote access digital mixing session has been interrupted due to loss or degradation of network connectivity between the client device and the virtual sound engineer device 104. In response to determining that the session has not been ended, the processor 302 returns to block 608 where the processor 302 continues to permit remote accessing of the client digital mixing board, e.g., using remote access environment within the virtual sound engineering application, to monitor operation and control sound balance as output by the sound input and output by peripheral devices connected to the client digital mixing board.

In response to determining at block 610 that the session has been ended, the processor 302, at block 612, prevents remote accessing of the client digital mixing board, e.g., using remote access environment within the virtual sound engineering application, to monitor operation and control sound balance as output by the sound input and output by peripheral devices connected to the client digital mixing board. The process 600 may then end. In some instances, the process 600 may be repeated in response to receiving a request to remotely access the client digital mixing board or in response to a different request.

FIG. 7 illustrates an example process 700 for generating access credentials for remotely accessing multiple digital mixing consoles. The process 700 may be executed by one or more components of the remote access digital mixing console application described in reference to at least FIGS. 1 and 2A-2B. The process 700 begins at block 702 where the processor 302 generates a unique digital mixing session identifier corresponding to a remote access digital mixing session and generates access credentials, such as, password, access code, key phrase, or another authentication parameter. At block 704, the processor 302 is configured to associate and store the generated unique digital mixing session identifier with the generated access credentials. At block 706, the processor 302 transmits a copy of the stored access credentials to the client device (e.g., the user device 140 and the user device 150) prior to requesting initiation of a remote access digital mixing session. The process 700 may then end. In some instances, the process 700 may be repeated in response to generating a unique digital mixing session identifier corresponding to a remote access digital mixing session or in response to a different request, action, or command.

Illustrative virtual sound system includes a digital mixing console configured to communicatively coupled to a mobile device, a wireless router connected, via a network, to the digital mixing console, a virtual sound engineer application installed on the mobile device and configured to receive user input and a digital mixer application configured to receive user input to control the digital mixing console.

A method for operating the virtual sound system includes powering on a digital mixing console, powering on a public address (PA) system, connecting a router to the digital mixing console, connecting the router to a network and connecting an onsite mobile device to the same network, launching a digital mixer application on the onsite mobile device, wherein the digital mixer application is configured to monitor and control operation of the digital mixing console. The method includes launching a virtual digital sound engineer application on the onsite mobile device and, in response to receiving an access code and password, using the received credentials to authorize remote management of the digital mixing console.

The method for operating the virtual sound system includes launching the virtual sound engineer application on a remote mobile device and sending a request to the onsite mobile device to access the virtual digital sound engineer application on the onsite mobile device, wherein the request includes an access code and password. In response to a confirmation that a connection with the onsite mobile device has been established, controlling, from the remote mobile device, the digital mixing console using the virtual sound engineer application.

MQTT (Message Queue Telemetry Transport) protocol and Java Spring Boot for Server Application. Establishing an MQTT session includes establishing a connection between a publisher and a subscriber. For example, the publisher opens the application and connects with a remote server. Upon establishing a connection with the publisher, the server assigns a unique session identifier to the publisher. The subscriber opens the application and connects with the server, and the server assigns a unique session identifier to the subscriber. The publisher shares this unique session identifier with the subscriber and the subscriber inputs the shared unique session identifier to connect with the publisher. The server validates the unique session identifier provided by the subscriber and, in response to the provided unique session identifier matching the assigned unique session identifier, the server connects the publisher and the subscriber.

MQTT session between server, publisher and subscriber, the server validates session detail of publisher and subscriber and establishes connection between them; the subscriber requests for session data; the publisher submits session data; the subscriber application renders session data into the actual screen of the application; the subscriber sends packets (issues commands) to the publisher; the subscriber controls publisher device; the publisher continuously sends packets; the subscriber continuously receives packets; the publisher and subscriber receives connection acknowledgement to publish packets. The server terminates the connection in response to detecting that one of the publisher and the subscriber disconnected from the session.

Figure 8:
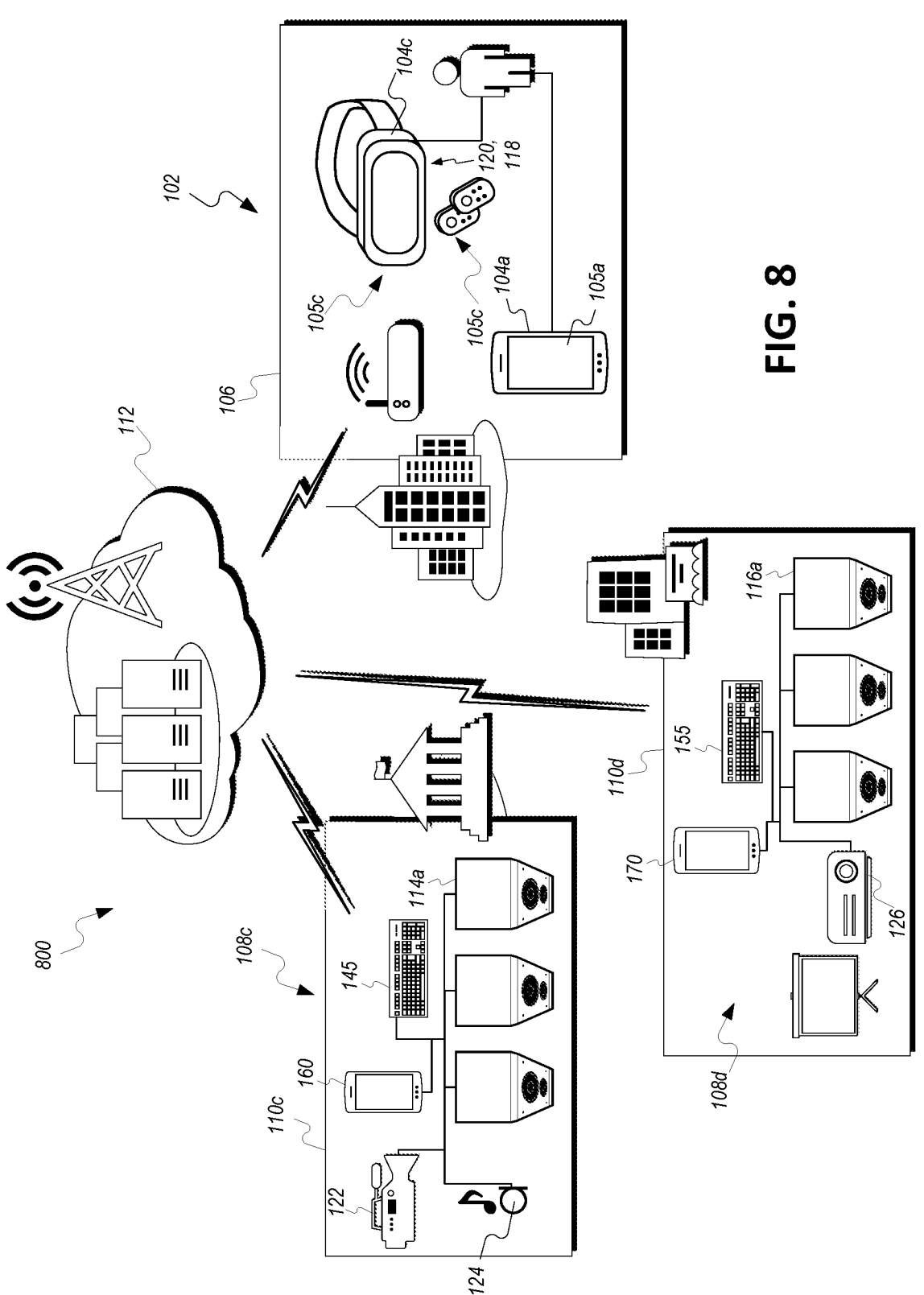
FIG. 8 is a block diagram illustrating another exemplary sound engineering system.

FIG. 8 depicts another illustrative system 800 for monitoring and controlling, from a remote location, sound input and output by peripheral devices located at different geographic locations from one another and from the remote location. The system 800 is similar to the system 100 and includes many of the same or similar devices and/or components, such as the virtual sound engineer system 102, the virtual sound engineer devices 104, the remote location 106, the digital mixing sites 108, and the network 112. Accordingly, the description above in connection with FIG. 1 is applicable to the corresponding devices and/or components of FIG. 8 and is not repeated herein so as not to obscure the present disclosure.

As shown in FIG. 8, the illustrative virtual sound engineer system 102 includes virtual sound engineer devices 104*a*, 104*c*. As described above, the virtual sound engineer device 104 may be embodied as a mobile or stationary device such as a computer, a smart phone, a tablet computer, a laptop computer, a notebook computer, a mobile computing device, a desktop computer, a work station, a cellular telephone, a handset, a messaging device, a vehicle telematics device, a network appliance, a web appliance, a distributed computing system, a multiprocessor system, a consumer electronic device, a digital television device, and/or any other computing device. The virtual sound engineer device 104*c* may be embodied as a head-mounted display, a heads-up display, a virtual reality device, augmented reality device, mixed reality device, a wearable device, or any other virtual reality device. Although illustrated as including separate virtual sound engineer devices 104*a*, 104*c*, in some embodiments the virtual sound engineer device 104*c* may be a standalone device including the virtual sound engineer access application 120.

The virtual sound engineer device 104*c* may provide access to the virtual sound engineer access application using one or more audio and visual output devices, such as, but not limited to, a head-mounted stereoscopic display, which may include one or more display screens and associated optics (e.g., aspheric lenses, Fresnel lenses, or similar). The virtual sound engineer device 104*c* may also include audio and visual output devices such as speakers and displays, and one or more audio and visual input devices, such as, but not limited to, microphones and cameras. The virtual sound engineer device 104*c* may receive user input using one or more user input interfaces 105, such as, but not limited to one or more physical controller devices 105*c* as shown in FIG. 8. Additionally or alternatively, the virtual sound engineer device 104*c* may be configured to perform speech, face, and hand gesture recognition and/or receive user input by way of voice commands, stylus inputs, single- or multi-touch gestures, and touchless hand gestures.

As shown in FIG. 8, the virtual sound engineer system 102 is disposed at the remote location 106. An additional digital mixing site 108*c* is located at a location 110*c* and a further additional digital mixing site 108*d* is located at a location 110*d*, where each of the locations 110*c*, 110*d* are different from one another and from the remote location 106. Each of the digital mixing sites 108*c*, 108*d* include corresponding user devices 160, 170, which are similar to the user devices 140, 150 described above. The user device 160 of the digital mixing site 108*c* is communicatively coupled to a digital mixing console 145 of the mixing site 108*c*, wherein the digital mixing console 145 is communicatively coupled to at least one peripheral device 114. Similarly, the user device 170 of the digital mixing site 108*d* is communicatively connected to a digital mixing console 155 of the mixing site 108*d*, wherein the digital mixing console 155 is communicatively coupled to one or more peripheral devices 116 of the mixing site 108*d*.

As shown, the digital mixing site 108*c* further includes audio and video input devices 122, 124, respectively, which may embodied as a video camera 122 and a microphone 124. The audio-video devices 122, 124 are configured to capture audio and video data indicative of the environment of the digital mixing site 108*c*, for example, views and/or audio from the interior of the location 110*c*. The audio-video devices 122, 124 are illustrated as being coupled to the digital mixing console 145; however, in other embodiments the audio-video devices 122, 124 may be coupled directly to the user device 160.

Similarly, the digital mixing site 108*d* further includes an audiovisual presentation device 126, which is illustratively embodied as a projector. In some embodiments, the audiovisual presentation device may be embodied as a display screen, television, monitor, laptop computer, or any other video and/or audio device or devices capable of displaying audiovisual presentation content at the digital mixing site 108*d*. The audiovisual presentation device 126 is illustrated as being coupled to the digital mixing console 155; however, in other embodiments the audiovisual presentation device 126 may be coupled directly to the user device 170.

As described above, the virtual sound engineer system 102 is configured to monitor and control sound output by one or more peripheral input and output devices 114, 116 communicatively coupled to the digital mixing console 145 of the digital mixing site 108*c* and the digital mixing console 155 of the digital mixing site 108*d*, respectively.

In an example, a client device the digital mixing site 108*c* (e.g., the client device 160) signs into the virtual sound engineer access application 120 and requests an access code. The virtual sound engineer device 104*c* receives a notification of the access code request and displays the notification in a virtual reality environment using the interface 105*c*. The virtual reality environment may be embodied as a metaverse or other virtual world that renders an immersive, three-dimensional representation of the real world (or an imagined world). After rendering the notification, the virtual sound engineer device 104*c* may send the requested authorization code to the client device 160 to complete the remote access digital mixing session connection.

In an example, the virtual sound engineering system 102*c* is configured to generate, a digital mixing console 118 including one or more controls for controlling input and output of the peripheral devices 114 of the digital mixing site 108*c*. The digital mixing console 118 may comprise a virtual digital mixing console, including one or more three-dimensional digital renderings, reproductions, or representations, whether exact or approximate, of the digital mixing console 145. Additionally or alternatively, the digital mixing console 118 may comprise a virtual or other three-dimensional digital representations indicative of remote access (by the virtual engineer device 104*c*) of the user device 160 connected to the first digital mixing console 145. In some instances, the digital mixing console 118, as rendered on the interface 105*c*, may include either same or different number (whether more or fewer) of controls as the digital mixing console 145. As just one example, one or more controls of the digital mixing console 145, as rendered on the interface 105*c*, may be arranged differently from corresponding controls of the digital mixing console 145.

Once the remote access digital mixing session connection is confirmed, the virtual sound engineer device 104*c* has visual and audio access to the session location 110*c* via the interface 105*c* via the virtual reality environment. For example, the virtual sound engineer device 104*c* may render a three-dimensional representation of the location 110*c* using real-time video and/or audio data captured at the location 110*c*. Visual access may be granted through an onsite camera, such as the video camera 122. The virtual reality environment may thus reflect the layout of the location 110*c* room including floors, walls, ceilings, furniture and/or equipment. Audio access may be granted through one or more peripheral devices 114 coupled to the digital mixing console 145 and/or through the microphone 124 that captures audio in the room. This multiple audio feed feature may allow the user to toggle between digital mixing console 145 audio and room audio while in the virtual reality environment. By having both room and mixing console 145 audio available, the system 100 allows the user to make necessary adjustments to the mixing console 145.

The virtual sound engineer device 104*c* may also provide one or more two-way communication channels between the session location 110*c* and the remote location 106. For example, the virtual sound engineer device 104*c* may provide a text chat feature, similar to the chat application 210, in the virtual reality environment. In some embodiments, the virtual sound engineer device 104*c* may provide a talk-back feature to allow the sound engineer at the remote location 106 to communicate with the client at the session location 110*c* directly by voice during the session.

In addition to remotely managing a single session, the virtual sound engineer access application 120 also gives the user at the virtual sound engineer device 104*c* the ability to manage multiple sessions, in different locations 110 at the same time. Each of those sessions may be rendered in the same virtual reality environment.

Additionally or alternatively, as another example, the virtual sound engineer access application 120 may allow the virtual sound engineer device 104*c* the ability to control audio and visual presentations at the site 110*d*. Many events include an audiovisual presentation device 126 such as a projector, and may require a sound engineer to manage the sound for the presenters and audience. Accordingly, after establishing a remote access digital mixing session connection between the virtual sound engineer device 104*c* and the user device 170 at the location 110*d*, the virtual sound engineer device 104*c* may control the presentation by the presentation device 126. For example, the virtual sound engineer device 104*c* may start the presentation, stop the presentation, move to the next or previous slide, or otherwise control the operation of the presentation device 126. In addition to managing the presentation, virtual sound engineer device 104c may play coordinated sounds or music with the presentation and otherwise control audio at the site 110d. This presentation control interface may be provided in a virtual reality environment as described above and/or with another interface 105 of the virtual sound engineer device 104.

Thus, the system 100 as described above may allow a sound engineer to control digital mixing consoles at multiple locations that are widely geographically spaced. The virtual reality environment or metaverse interface may provide efficient and intuitive control of multiple digital mixing consoles, and may allow the sound engineer to responsively control the digital mixing console based on conditions at the mixing session location (which may be different from the remote location). Further, the system 100 may provide integrated presentation and audio mixing control with a remote sound engineering session, which may improve presentation quality as compared to presentations that do not employ a sound engineer.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. The invention is not limited to the specific embodiments disclosed, and may include different combinations of the elements disclosed, omission of some elements or the replacement of elements by the equivalents of such structures.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A virtual sound engineer system comprising a mobile device coupled to a head-mounted display, the mobile device configured to:

in response to receipt of a first access code including authorization information, initiate a first remote access digital mixing session by generating a virtual sound engineering dashboard to remotely access a first digital mixing console disposed at a first location, and wherein the first digital mixing console is communicatively coupled to a first plurality of peripheral devices disposed at the first location;

receive real-time audio and video data captured by at least one of the peripheral devices of the first digital mixing console at the first location in response to initiating the first remote access digital mixing session;

display, with the head-mounted display at a second location different from the first location, the virtual sound engineering dashboard in a virtual reality interface based on the real-time audio and video data; and control the first digital mixing console with the virtual sound engineering dashboard in the virtual reality interface;

wherein the mobile device is further configured to:

in response to receiving a second access code including authorization information, initiate a second remote access digital mixing session by generating the virtual sound engineering dashboard to remotely access a second digital mixing console disposed at a third location, and wherein the second digital mixing console is communicatively coupled to a second plurality of peripheral devices disposed at the third location; and display, with the head-mounted display at the second location different from the first location and the third location, the virtual sound engineering dashboard in the virtual reality interface;

wherein the first remote access digital mixing session and the second remote access digital mixing session occur concurrently at the first digital mixing console and the second digital mixing console, wherein:

the received real-time audio and video data corresponds with real-time audio and video events at the first location which corresponds with the first digital mixing console;

real-time modifications are made to the received real-time audio and video data at the third location which corresponds to the second digital mixing console; and the real-time modifications made to the received real-time audio and video data at the third location are concurrently broadcast back to the first location as the real-time modifications to the received real-time audio and video data are made at the third location.

2. The system of claim 1, wherein to display the virtual sound engineering dashboard in the virtual reality interface comprises to render a three-dimensional representation of the first digital mixing console.

3. The system of claim 1, wherein to display the virtual sound engineering dashboard in the virtual reality interface comprises to render a three-dimensional representation of the first location based on the real-time audio and video data captured by the at least one of the peripheral devices.

4. The system of claim 1, wherein the first digital mixing console comprises a plurality of user controls corresponding to the plurality of peripheral devices communicatively coupled thereto, and wherein to display the virtual sound engineering dashboard in the virtual reality interface comprises to render a plurality of virtual user controls corresponding to the plurality of user controls.

5. The system of claim 4, wherein:

the mobile device is further configured to receive user input indicating a change in position of a virtual user control associated with at least one of the plurality of peripheral devices; and to control the first digital mixing console comprises to control real-time audio output by the at least one of the plurality of peripheral devices in response to receipt of the user input.

6. The system of claim 1, wherein:

to receive the real-time audio and video data comprises to receive first real-time audio data indicative of an environment of the first location and second real-time audio data indicative of audio output by at least one of the plurality of peripheral devices communicatively coupled to the first digital mixing console; and to display the virtual sound engineering dashboard in the virtual reality interface comprises to provide output of the first real-time audio data or the second real-time audio data.

7. The system of claim 1, wherein the mobile device is further configured to:

display, with the head-mounted display, a notification indicative of a request to initiate the first remote access digital mixing session;

generate the first access code including the authorization information in response to display of the notification; and transmit the first access code including the authorization information to a first user device disposed at the first location and coupled to the first digital mixing console;

wherein the first access code is received from the first user device after transmission of the first access code.

8. The system of claim 1, wherein the mobile device is further configured to control an audiovisual presentation device disposed at the first location with the virtual sound engineering dashboard in the virtual reality interface.

9. The system of claim 1, wherein the mobile device is further configured to establish a two-way communication channel between the first location and the second location with the head-mounted display in the virtual reality interface.

10. The system of claim 9, wherein the two-way communication channel comprises text chat or voice communication.

11. One or more non-transitory, computer-readable storage media comprising a plurality of instructions that in response to being executed cause a mobile device to:

in response to receiving a first access code including authorization information, initiate a first remote access digital mixing session by generating a virtual sound engineering dashboard to remotely access a first digital mixing console disposed at a first location, and wherein the first digital mixing console is communicatively coupled to a first plurality of peripheral devices disposed at the first location;

receive real-time audio and video data captured by at least one of the peripheral devices of the first digital mixing console at the first location in response to initiating the first remote access digital mixing session;

display, with a head-mounted display at a second location different from the first location, the virtual sound engineering dashboard in a virtual reality interface based on the real-time audio and video data; and control the first digital mixing console with the virtual sound engineering dashboard in the virtual reality interface;

wherein the mobile device is further configured to:

in response to receiving a second access code including authorization information, initiate a second remote access digital mixing session by generating the virtual sound engineering dashboard to remotely access a second digital mixing console disposed at a third location, and wherein the second digital mixing console is communicatively coupled to a second plurality of peripheral devices disposed at the third location; and display, with the head-mounted display at the second location different from the first location and the third location, the virtual sound engineering dashboard in the virtual reality interface;

wherein the first remote access digital mixing session and the second remote access digital mixing session occur concurrently at the first digital mixing console and the second digital mixing console, wherein:

the received real-time audio and video data corresponds with real-time audio and video events at the first location which corresponds with the first digital mixing console;

real-time modifications are made to the received real-time audio and video data at the third location which corresponds to the second digital mixing console; and the real-time modifications made to the received real-time audio and video data at the third location are concurrently broadcast back to the first location as the real-time modifications to the received real-time audio and video data are made at the third location.

12. The one or more computer-readable storage media of claim 11, wherein to display the virtual sound engineering dashboard in the virtual reality interface comprises to render a three-dimensional representation of the first digital mixing console.

13. The one or more computer-readable storage media of claim 11, wherein to display the virtual sound engineering dashboard in the virtual reality interface comprises to render a three-dimensional representation of the first location based on the real-time audio and video data captured by the at least one of the peripheral devices.

14. The one or more computer-readable storage media of claim 11, wherein:

to receive the real-time audio and video data comprises to receive first real-time audio data indicative of an environment of the first location and second real-time audio data indicative of audio output by at least one of the plurality of peripheral devices communicatively coupled to the first digital mixing console; and to display the virtual sound engineering dashboard in the virtual reality interface comprises to provide output of the first real-time audio data or the second real-time audio data.

15. The one or more computer-readable storage media of claim 11, further comprising a plurality of instructions that in response to being executed cause the mobile device to control an audiovisual presentation device disposed at the first location with the virtual sound engineering dashboard in the virtual reality interface.

16. A method for a virtual sound engineer system, the method comprising:

in response to receiving a first access code including authorization information, by a mobile device, initiating a first remote access digital mixing session by generating a virtual sound engineering dashboard to remotely access a first digital mixing console disposed at a first location, and wherein the first digital mixing console is communicatively coupled to a first plurality of peripheral devices disposed at the first location;

receiving, by the mobile device, real-time audio and video data captured by at least one of the peripheral devices of the first digital mixing console at the first location in response to initiating the first remote access digital mixing session;

displaying, by the mobile device, with a head-mounted display at a second location different from the first location, the virtual sound engineering dashboard in a virtual reality interface based on the real-time audio and video data; and controlling, by the mobile device, the first digital mixing console with the virtual sound engineering dashboard in the virtual reality interface;

wherein the mobile device is further configured to:

in response to receiving a second access code including authorization information, initiate a second remote access digital mixing session by generating the virtual sound engineering dashboard to remotely access a second digital mixing console disposed at a third location, and wherein the second digital mixing console is communicatively coupled to a second plurality of peripheral devices disposed at the third location; and display, with the head-mounted display at the second location different from the first location and the third location, the virtual sound engineering dashboard in the virtual reality interface;

wherein the first remote access digital mixing session and the second remote access digital mixing session occur concurrently at the first digital mixing console and the second digital mixing console, wherein:

the received real-time audio and video data corresponds with real-time audio and video events at the first location which corresponds with the first digital mixing console;

wherein real-time modifications are made to the received real-time audio and video data at the third location which corresponds to the second digital mixing console; and the real-time modifications made to the received real-time audio and video data at the third location are concurrently broadcast back to the first location as the real-time modifications to the received real-time audio and video data are made at the third location.

17. The method of claim 16, wherein displaying the virtual sound engineering dashboard in the virtual reality interface comprises rendering a three-dimensional representation of the first location based on the real-time audio and video data captured by the at least one of the peripheral devices.

18. The method of claim 16, wherein:

receiving the real-time audio and video data comprises receiving first real-time audio data indicative of an environment of the first location and second real-time audio data indicative of audio output by at least one of the plurality of peripheral devices communicatively coupled to the first digital mixing console; and displaying the virtual sound engineering dashboard in the virtual reality interface comprises providing output of the first real-time audio data or the second real-time audio data.

19. The method of claim 16, wherein the first digital mixing console comprises a plurality of user controls corresponding to the plurality of peripheral devices communicatively coupled thereto, and wherein displaying the virtual sound engineering dashboard in the virtual reality interface comprises to render a plurality of virtual user controls corresponding to the plurality of user controls.

20. The method of claim 19, wherein:

the mobile device is further configured to receive user input indicating a change in position of a virtual user control associated with at least one of the plurality of peripheral devices; and controlling the first digital mixing console comprises controlling real-time audio output by the at least one of the plurality of peripheral devices in response to receipt of the user input.

\* \* \* \* \*